(12) United States Patent
Giffin et al.

(10) Patent No.: US 7,074,381 B1
(45) Date of Patent: Jul. 11, 2006

(54) PROCESS FOR PRODUCING AMMONIUM POLYTHIOMOLYBDATE

(75) Inventors: Gregory C. Giffin, Martinsville, NJ (US); Ronald P. Wangner, Garden City, NY (US); Grant O. Hutchings, Hoboken, NJ (US); John Spanton, Parlin, NJ (US)

(73) Assignee: Infineum International Limited (GB)

( * ) Notice: Subject to any disclaimer, the term of this patent is extended or adjusted under 35 U.S.C. 154(b) by 0 days.

(21) Appl. No.: 11/151,116

(22) Filed: Jun. 13, 2005

(51) Int. Cl.
*C01B 17/00* (2006.01)
*C01B 17/98* (2006.01)
*C01G 39/00* (2006.01)
*C01G 39/06* (2006.01)

(52) U.S. Cl. ..................... 423/511; 423/517
(58) Field of Classification Search ................ 423/517, 423/511
See application file for complete search history.

(56) References Cited

U.S. PATENT DOCUMENTS

| 3,764,649 | A |   | 10/1973 | Kurtak et al. | 423/56 |
| 3,876,755 | A | * | 4/1975  | Kurtak et al. | 423/517 |
| 4,604,278 | A |   | 8/1986  | Reilly et al. | 423/517 |
| 5,300,274 | A | * | 4/1994  | Wei et al.    | 423/511 |
| 6,953,565 | B1 | * | 10/2005 | Wangner et al. | 423/511 |
| 2005/0089462 | A1 | * | 4/2005 | Wangner et al. | 423/351 |

OTHER PUBLICATIONS

Mueller et al., "Molybdenum-sulfur clusters", Inorganic Syntheses, vol. 27, pp. 47-51, 1990.*
Chemical Abstract accession No. 116:98146: "Studies on the triangular [molybdate-disulfido-sulfido] cluster [Mo3S13]2-: electronic structure . . . , crystal structure of (Ph4As)2[Mo3S13].2CH3CN and . . . ", Mueller et al., published 1991.*
Chemical Abstract accession No. 119:151081: "Molybdenum(IV) sulfide-disulfide complex ([MoIV3S(S2)6]2-) from amorphous molybdenum trisulfide by the reaction with hydroxide and R=0.015 structure of (NH4)2[MoIV3S(S2)6].H2O", Mueller et al., published 1993.*

* cited by examiner

*Primary Examiner*—Stanley S. Silverman
*Assistant Examiner*—Ardith E. Hertzog

(57) ABSTRACT

A process for preparation of an ammonium polythiomolybdate or a hydrate thereof of the formula $(NH_4)_2Mo_3S_{13} \cdot n H_2O$ where n is 0, 1 or 2, in which aqueous ammonium monosulfide, elemental sulfur and molybdic oxide are reacted in a sealed reactor, with hydrogen sulfide gas being fed into the reactor until the hydrogen sulfide is no longer absorbed by the reaction mixture to form a reaction product and then heating the reaction product in a sealed reactor, the concentration of ammonium monosulfide in the reaction mixture being controlled throughout the reaction such that reactor pressure does not exceed 700 kPa (100 psig).

17 Claims, No Drawings

PROCESS FOR PRODUCING AMMONIUM POLYTHIOMOLYBDATE

This invention relates to a process for producing an ammonium polythiomolybdate or a hydrate thereof of the formula $(NH_4)_2Mo_3S_{13}.nH_2O$ (ATM). More particularly, it relates to a process for producing ammonium polythiomolybdate which can be carried out economically on a commercial scale which can be operated at a desired pressure.

Ammonium polythiomolybdate has found use as a precursor in the preparation of molybdenum additives for lubricants, for example trinuclear molybdenum compounds such as trinuclear molybdenum dithiocarbamates.

U.S. Pat. No. 3,764,649 discloses the preparation of ammonium polythiomolybdate of the formula $3MoS_4.2NH_4OH$ by reacting an aqueous ammoniacal solution of ammonium molybdate and ammonium polysulfide at 175–220° C. and 300–700 psig. U.S. Pat. No. 4,604,278 teaches the production of ammonium tetrathiomolybdate by reacting an ammoniacal molybdate solution with hydrogen sulfide gas in a closed system.

Laboratory scale methods for production of $(NH_4)_2Mo_3S_{13}.nH_2O$ are known from, for example, Molybdenum-Sulfur Clusters by Müller et al, published in Inorganic Syntheses (1990), 27, 47–51. The methods disclosed therein require ammonium polysulfide and an ammonium molybdate solution to be reacted together at 95–98° C. for 5 days.

In order to render such techniques suitable for commercial scale production the reaction must be carried out under high temperature (of the order of 180–200° C.) and high pressure (of the order of 5 MPa or 700 psig). Operation at high pressure in particular is expensive due to the specialised equipment required to address the risks associated with handling hazardous material in such high temperature and pressure process conditions. Furthermore, such conventional processes tend to result in the formation of ammonium thiosulfate as an undesired impurity which must be removed.

Preferred embodiments of the present invention seek to provide a method of producing $(NH_4)_2Mo_3S_{13}.nH_2O$ or hydrates thereof under improved operating conditions.

The present invention provides a process for producing an ammonium polythiomolybdate or a hydrate thereof of the formula $(NH_4)_2Mo_3S_{13}.n\,H_2O$ where n is 0, 1 or 2 comprising:
(a) in a first reaction step, reacting, in a sealed reactor, aqueous ammonium monosulfide, elemental sulfur and molybdic oxide, with hydrogen sulfide gas being fed into the reactor until the hydrogen sulfide is no longer absorbed by the reaction mixture;
(b) in a second reaction step, heating the reaction product of the first reaction step in a sealed reactor;

wherein, the concentration of ammonium monosulfide in the reaction mixture is controlled throughout the reaction to control the pressure in the reactor.

The present invention provides for the pressure in the reactor to be controlled so that it does not exceed a desired maximum pressure, by controlling the concentration of ammonium monosulfide in the reaction mixture. Therefore, the reaction can be designed such that high pressure reactors are not required. This provides for a marked reduction in production costs and increased operating safety. Suitably, the pressure in the reactor is no greater than 700 kPa (100 psig), preferably no greater than 420 kPa (60 psig), more preferably no greater than 350 kPa (50 psig).

The concentration of ammonium monosulfide in the reaction mixture may be controlled by any suitable manner. For example, the concentration of ammonium monosulfide may be controlled by controlling the relative concentration of reagents charged into the reactor. Alternatively, or in addition, the concentration of ammonium monosulfide may be controlled by diluting the reaction mixture with an inert diluent. A suitable inert diluent is water. The diluent may be added to the reaction mixture at any stage of the reaction process, but is suitably charged to the reactor at the start of one or both of the reaction steps.

In a preferred embodiment the concentration of ammonium monosulfide does not exceed 2 mol % based on the total reaction mixture. Advantageously, the concentration of ammonium monosulfide does not exceed 1.5 mol %, preferably does not exceed 1 mol % and more preferably does not exceed 0.5 mol % based on the total reaction mixture.

It is thought that the concentration of ammonium monosulfide may exceed the concentration required to achieve the desired pressure for a limited period of time, for example, less than 10 minutes, preferably less than 5 minutes, without detrimental effect. However, the concentration of ammonium monosulfide preferably does not exceed the required concentration for substantially the whole reaction process and advantageously the whole reaction process.

The first reaction step is preferably carried out without addition of heat. The first reaction step is exothermic. Therefore, if necessary cooling may be applied, either directly or indirectly, to the reaction mixture in order to control the pressure in the reactor. Suitably, the temperature in the reactor is maintained at around ambient temperature, for example between 20 and 50° C.

The aqueous ammonium monosulfide and elemental sulfur present in the reaction mixture will react to produce ammonium polysulfide. This reaction may be carried out separately from the present invention and aqueous ammonium polysulfide may be charged to the reactor at the beginning of the first reaction step in place of part or all of the aqueous ammonium monosulfide and elemental sulfur. It should be noted that ammonium polysulfide exists in equilibrium with ammonium monosulfide and sulfur. Therefore, the reaction mixture will always comprise a mixture of ammonium polysulfide and ammonium monosulfide.

In the first reaction step the reactants are suitably added in generally stoichiometric amounts. However, the total amount of sulfur present in the reaction mixture may be in excess of the stoichiometric amount. More particularly there is preferably an excess of sulfur relative to amount of the molybdic oxide. In a preferred embodiment, an excess of sulfur is charged to the reactor at the beginning of the first reaction step. Whilst additional sulfur may be added to the reaction mixture during the reaction process, it is preferred that all of the sulfur is added to the reaction mixture during the first reaction step. The total amount of sulfur present in the reaction mixture may be at least 2, preferably at least 3, more preferably at least 4 and can be greater than 5 moles per mole of molybdic oxide.

The reactions are carried out in an aqueous environment. All of the water in the reaction mixture may be provided as a solvent of other reactants, such as the ammonium polysulfide or ammonium monosulfide. Alternatively, or in addition water may also be separately added to the reactor. Whilst water may be added at any stage of the reaction process, in a preferred embodiment of the present invention, any water added separately during the reaction process is added at the start of one or both reaction steps.

The first reaction step may take between 1 and 6 hours, often between 3 and 5 hours, to complete. Completion of the first reaction step is indicated by the completion of any exotherm. Since the first reaction step is exothermic, without cooling the temperature will be elevated from about 20° C. to about 40° C. during the reaction. When the temperature begins to drop, it indicates that the reaction has reached completion. In addition consumption of the hydrogen sulfide gas by the reaction mixture will stop when the reaction mixture has reached equilibrium.

In the second reaction step, the reaction mixture is heated to produce $(NH_4)_2Mo_3S_{13}.n\ H_2O$. Suitably, the reaction mixture is heated to a temperature of 80 to 100° C., preferably 85–95° C., ideally around 90° C. The second reaction step may take 4–10, preferably 6–8 hours.

After completion of the second reaction step, the reaction mixture is cooled and the solid product is separated from the mother liquor by any suitable method, with the preferred method being filtration. The mother liquor may then be recycled back into the process at the beginning of the first reaction step.

The first reaction step may be carried out in a separate reactor from the second reaction step. Preferably, the first and second reaction steps are carried out sequentially in the same reactor.

One preferred reactor system for operating the first reaction step in a continuous mode comprises a reactive distillation/absorber column where hydrogen sulfide is introduced into the bottom of the column and the other raw materials are introduced at the top and an intermediate slurry product is extracted from the bottom and thereafter heated in a second reactor to carry out the second reaction step. This method would permit continuous operation of the process.

Without wishing to be bound by any theory, it is thought that ammonium polythiomolybdate (ATM) is produced in two reaction steps. The first involves the reaction of the molybdic oxide (MOX) raw material with sulfur to form an intermediate ammonium tetrathiomolybdate (ATTM). The second step in the reaction converts the ATTM intermediate into ATM. The two reaction equations are set out below:

$$MoO_3 + (NH_4)_2S + 3H_2S \rightarrow (NH_4)_2MoS_4 + 3H_2O \quad (1)$$

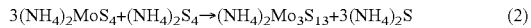

$$3(NH_4)_2MoS_4 + (NH_4)_2S_4 \rightarrow (NH_4)_2Mo_3S_{13} + 3(NH_4)_2S \quad (2)$$

The present invention will now be illustrated by way of example only, with reference to the following examples.

EXAMPLE 1

10.0 g of molybdic oxide and 6.11 g of sulfur were mixed with 166.4 g of water. To the resulting mixture, 18.6 g of 42.3% ammonium monosulfide in water solution was added, upon addition of the ammonium monosulfide solution, the reaction commenced.

The reaction was carried out in a sealed reactor. The reaction solution was mixed and cooled via a cooling water coil, while hydrogen sulfide was added at a regulated pressure of 103 kPa (15 psig) to the solution via a dip tube submerged in the liquid reaction mixture. The cooling loop maintained a temperature between ambient and 35° C. The reaction was run for approximately 3 hours. After 3 hours, the hydrogen sulfide feed was stopped and the reactor pressure monitored; if the reactor pressure dropped, the hydrogen sulfide feed was restarted. Periodic checking for hydrogen sulfide digestion continued until no pressure decrease was detected, indicating that the reaction was complete. The reaction was complete after about 4 hours.

The reaction solution was then heated to 90° C., ramping from ambient temperature over 30 minutes. The reaction solution was held for 6 hours at 90° C. with mixing. During the 6 hour reaction, the pressure of the vessel increased up to approximately 275 kPa (40 psig), but then decreased to ambient over the course of the reaction.

The finished slurry was cooled to ambient temperature over 30 minutes and then filtered using an appropriate laboratory method. The initial filtrate (mother liquor) was retained and recycled back to the reactor for use in Example 2. The resulting solid was water washed with approximately 100 g of water. The yield of $(NH_4)_2Mo_3S_{13}.n\ H_2O$ was 97 mass % based on the total molybdenum mass charged to the reactor.

EXAMPLE 2

10.0 g of molybdic oxide and 3.06 g of sulfur were dissolved in 150 g of mother liquor filtrate recovered from Example 1. To this solution, 31.14 g of water and 6.91 g of 42.3% ammonium monosulfide solution in water was added. Upon addition of ammonium sulfide solution, the reaction commenced.

The synthesis was then carried out as per Example 1. The initial filtrate is retained as per Example 1 for recycling. The yield of $(NH_4)_2Mo_3S_{13}.n\ H_2O$ was 94% based on the total molybdenum mass charged to the reactor.

What is claimed is:

1. A process for producing an ammonium polythiomolybdate or a hydrate thereof of the formula $(NH_4)_2Mo_3S_{13}.n\ H_2O$ where n is 0, 1 or 2 comprising:
   (a) in a first reaction step, reacting, in a sealed reactor, aqueous ammonium monosulfide, elemental sulfur and molybdic oxide, with hydrogen sulfide gas being fed into the reactor until the hydrogen sulfide is no longer absorbed by the reaction mixture; and
   (b) in a second reaction step, heating the reaction product of the first reaction step in a sealed reactor;
wherein, the concentration of ammonium monosulfide in the reaction mixture is controlled throughout the reaction such that pressure in the reactor of both steps (a) and (b) does not exceed 700 kPa (100 psig).

2. The process according to claim 1, wherein the reaction mixture comprises an excess of the stoichiometric amount of sulfur compared to the amount of molybdic oxide in the reaction mixture.

3. The process according to claim 2, wherein the total amount of sulfur present in the reaction mixture is at least 2 moles per mole of molybdic oxide.

4. The process according to claim 3, wherein the total amount of sulfur present in the reaction mixture is at least 3 moles per mole of molybdic oxide.

5. The process according to claim 4, wherein the total amount of sulfur present in the reaction mixture is at least 4 moles per mole of molybdic oxide.

6. The process according to claim 5, wherein the total amount of sulfur present in the reaction mixture is greater than 5 moles per mole of molybdic oxide.

7. The process according to claim 1, wherein the concentration of ammonium monosulfide in the reaction mixture does not exceed 2 mol %, based upon the total reaction mixture.

8. The process according to claim 2, wherein the concentration of ammonium monosulfide in the reaction mixture does not exceed 1 mol %, based upon the total reaction mixture.

9. The process according to claim 8, wherein the concentration of ammonium monosulfide in the reaction mixture does not exceed 0.5 mol %, based upon the total reaction mixture.

10. The process according to claim 1, wherein in the second reaction step the reaction mixture of the first reaction step is heated to between 80 and 100° C.

11. The process according to claim 10, wherein in the second reaction step the reaction mixture of the first reaction step is heated to between 85 to 95° C.

12. The process according to claim 1, wherein the pressure in the reactor during the first and second reaction steps does not exceed 420 kPa (60 psig).

13. The process according to claim 12, wherein the pressure in the reactor during the first and second reaction steps does not exceed 350 kPa (50 psig).

14. The process according to claim 1, wherein the aqueous ammonium monosulfide and elemental sulfur are charged into the reactor as aqueous ammonium polysulfide.

15. The process according to claim 1, wherein water is added to the reaction mixture as a solvent for other reactants and/or as a separate reactant.

16. The process according to claim 1, wherein said first reaction step is carried out in a continuous mode using a reactive distillation/absorber and the second reaction step is carried out in a separate reactor.

17. The process according to claim 1, wherein the first reaction step and the second reaction step are carried out sequentially in the same reactor.

* * * * *